US009219644B2

(12) United States Patent
Renzin

(10) Patent No.: US 9,219,644 B2
(45) Date of Patent: Dec. 22, 2015

(54) AUTOMATED CONFIGURATION OF NEW RACKS AND OTHER COMPUTING ASSETS IN A DATA CENTER

(71) Applicant: Facebook, Inc., Menlo Park, CA (US)

(72) Inventor: Aleksandr Renzin, Pacifica, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/304,485

(22) Filed: Jun. 13, 2014

(65) Prior Publication Data

US 2014/0304336 A1 Oct. 9, 2014

Related U.S. Application Data

(63) Continuation of application No. 13/114,775, filed on May 24, 2011, now Pat. No. 8,793,351.

(51) Int. Cl.
*G06F 15/177* (2006.01)
*H04L 12/24* (2006.01)

(52) U.S. Cl.
CPC .............. *H04L 41/08* (2013.01); *G06F 15/177* (2013.01)

(58) Field of Classification Search
CPC .................................. G06F 3/00; G06F 15/173
USPC ................... 709/220–222; 340/16.1; 713/100
See application file for complete search history.

(56) References Cited

U.S. PATENT DOCUMENTS

| | | | |
|---|---|---|---|
| 6,473,762 B1 * | 10/2002 | Knoblock | G06F 17/5004 |
| 6,762,691 B2 | 7/2004 | Piazza | |
| 7,460,978 B1 | 12/2008 | Brey et al. | |
| 7,574,491 B2 | 8/2009 | Stein et al. | |
| 7,685,323 B1 | 3/2010 | Moore et al. | |
| 2002/0161863 A1 * | 10/2002 | McGuire | H04L 41/0806 709/220 |
| 2004/0015957 A1 | 1/2004 | Zara et al. | |
| 2005/0010499 A1 * | 1/2005 | Farkas | G06Q 10/087 705/28 |
| 2005/0050272 A1 | 3/2005 | Behrens et al. | |
| 2005/0246436 A1 * | 11/2005 | Day | H04L 29/06 709/223 |
| 2006/0116023 A1 | 6/2006 | Spitaels et al. | |
| 2008/0091701 A1 * | 4/2008 | Gujarathi | G06Q 10/087 |
| 2008/0272887 A1 * | 11/2008 | Brey | H04L 12/24 340/10.1 |
| 2009/0019535 A1 | 1/2009 | Mishra et al. | |
| 2009/0219536 A1 * | 9/2009 | Piazza | G01S 5/16 356/445 |

(Continued)

OTHER PUBLICATIONS

United States Office Action, U.S. Appl. No. 13/114,775, Nov. 22, 2013, nineteen pages.

(Continued)

*Primary Examiner* — Asad Nawaz
*Assistant Examiner* — Berhanu Belete
(74) *Attorney, Agent, or Firm* — Fenwick & West LLP

(57) ABSTRACT

A configuration tool is used to configure new server racks and computing assets in a data center. When new server racks are placed in a data center, the configuration tool scans the racks to identify any unconfigured server racks and then determines their virtual locations. The tool queries a mapping between the physical and virtual rack locations in the data center to determine the physical location for each rack based on its virtual location. Using the acquired physical and virtual locations for each unconfigured rack, the configuration tool can configure the unconfigured racks. For example, the configuration tool may identify the assets contained in the rack and associate the rack's physical location with those assets. In addition, the configuration tool can determine the rack's VLAN and use that information to configure the TOR switch associated with the rack.

13 Claims, 3 Drawing Sheets

(56) References Cited

U.S. PATENT DOCUMENTS

| | | |
|---|---|---|
| 2010/0306408 A1 | 12/2010 | Greenberg et al. |
| 2010/0322582 A1 | 12/2010 | Cooke et al. |
| 2011/0077795 A1* | 3/2011 | VanGilder ............... G06F 1/206 700/300 |
| 2011/0191454 A1 | 8/2011 | Joukov |
| 2011/0318011 A1 | 12/2011 | Brassil |
| 2012/0005344 A1 | 1/2012 | Kolin et al. |

OTHER PUBLICATIONS

United States Office Action, U.S. Appl. No. 13/114,775, Jul. 19, 2013, sixteen pages.

United States Advisory Action, U.S. Appl. No. 13/114,775, Oct. 7, 2013, three pages.

United States Office Action, U.S. Appl. No. 13/114,775, Mar. 1, 2013, fifteen pages.

* cited by examiner

| Type | Serial | MAC | Rack Serial | Position |
|---|---|---|---|---|
| Server | 0001 | 01-23-45-67-89-ab | 1234 | DC/Suite/Row/Rack/Pos |
| Server | 0002 | 01-23-45-67-89-ac | 1234 | DC/Suite/Row/Rack/Pos |
| Server | 0003 | 01-23-45-67-89-ad | 1234 | DC/Suite/Row/Rack/Pos |
| ... | ... | ... | ... | ... |
| | | | | |
| | | | | |

AUTOMATED CONFIGURATION OF NEW RACKS AND OTHER COMPUTING ASSETS IN A DATA CENTER

CROSS REFERENCE TO RELATED APPLICATIONS

This application is a continuation of U.S. application Ser. No. 13/114,775, filed May 24, 2011, which is incorporated herein by reference in its entirety.

BACKGROUND

This invention relates generally to data center operation, and in particular to configuring a server rack or other computing asset by determining its physical and/or virtual locations in the data center using an automated process.

As the internet has evolved, the bandwidth, processing, and storage requirements of websites and other internet-enabled applications have dramatically increased. Data centers have become increasingly important in providing these computing resources to support the internet activity of companies, schools, and many other internet-dependent entities. Data centers may have massively complex infrastructure, having tens of thousands or more servers. Servers may be stacked vertically within server racks ("racks"), and racks may be organized into rows within a data center suite. Each rack may comprise a unique rack serial number which identifies the rack. Each rack may also be topped with a network switch (a "top-of-rack" or TOR switch). For the servers in a rack to be operational within a network segment, they must be coupled (usually by network cable or fiber) to the rack's TOR switch.

Multiple racks may be connected to a cluster switch, which organizes racks into virtual local area networks (VLANs). In one embodiment, a cluster switch comprises multiple input/output ports, each of which may be coupled to a rack's TOR switch. A cluster switch may contain multiple racks within one VLAN, or it may associate one or more racks within multiple VLANs. A rack's "virtual location" may be expressed as the identity of a cluster switch port, the VLAN, or the cluster switch itself to which the rack's TOR switch is coupled. The "physical location" of a rack may refer to the actual location of the rack within a row, suite, and data center.

To determine each rack's physical location within a data center suite, data center operators manually scan the rack during installation to determine the rack serial number and manually associate the rack serial number with the physical location of the scanned rack. For data centers with thousands of servers, this manual scanning process is extremely time consuming. Further, as this process requires manual rack serial number and physical location association, there is potential for human error resulting in a rack being incorrectly associated with a physical location. Thus, there is a need for an automated solution for associating data center rack identities with physical rack locations to configure the server racks and the computing assets within the data center.

SUMMARY

Embodiments of the invention enable data center operators to configure new server racks and computing assets in a data center in a way that obviates the need for at least some of the manual steps required by previous methods. In one embodiment, when new server racks are placed in a data center, a configuration tool is used to scan the racks and identify one or more unconfigured server racks. The configuration tool then determines the virtual location of any unconfigured server racks that are found. By querying a mapping between the physical and virtual rack locations in the data center, the configuration tool can determine the physical location of each rack based on its virtual location. Using the acquired physical and virtual locations for each unconfigured rack, the configuration tool may configure the rack. For example, the configuration tool may identify the assets contained in the rack and associate the rack's physical location with those assets. Moreover, using the physical location of the rack, the configuration tool can also determine the rack's VLAN and use that information to configure the TOR switch associated with the rack.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
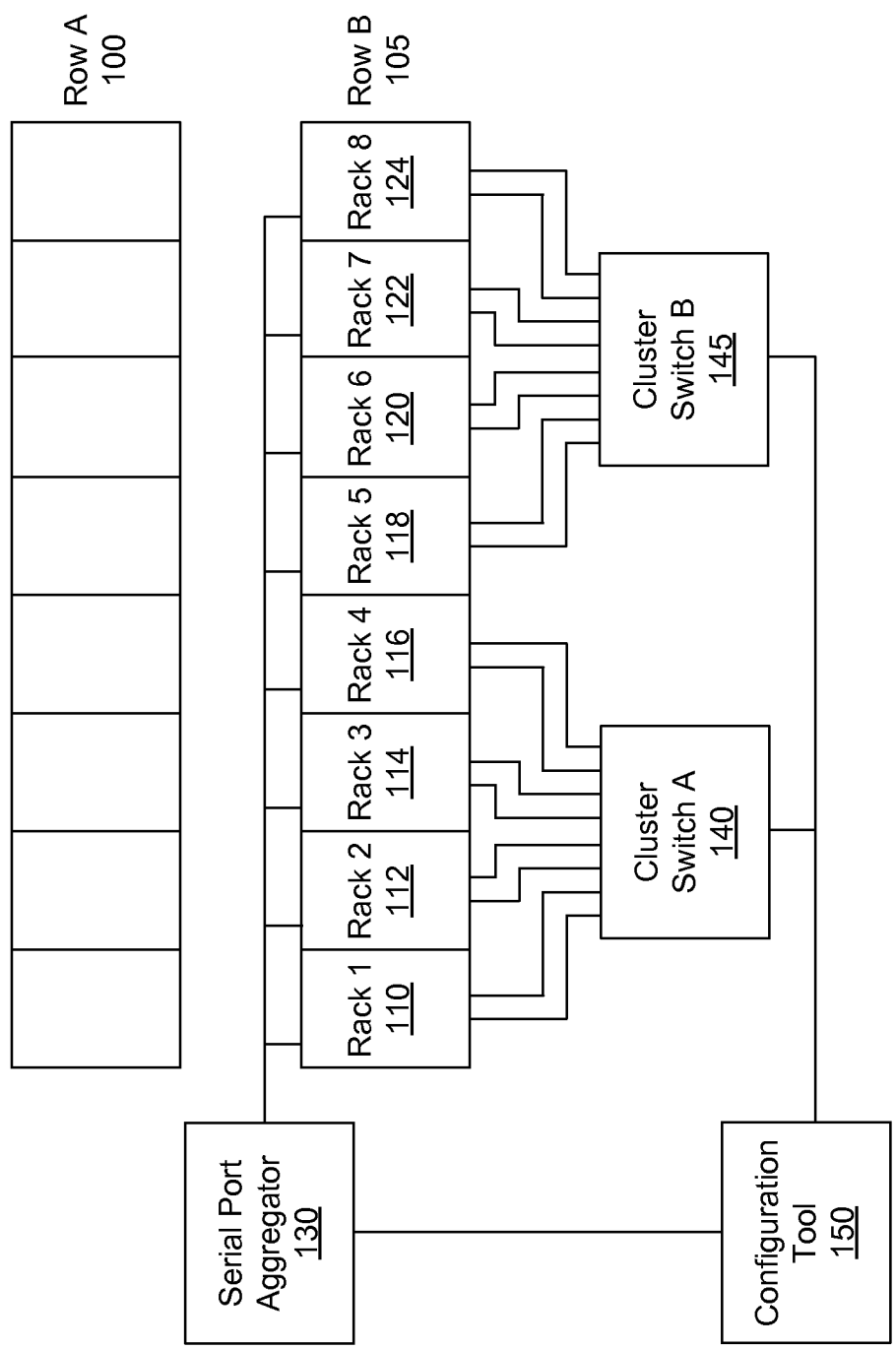
FIG. 1 is a high level block diagram illustrating a data center suite according to one embodiment.

FIG. 1 is a high level block diagram illustrating a data center suite according to one embodiment. FIG. 1 illustrates two rows of racks, row A 100 and row B 105. Within row B 105 are rack 1 110, rack 2 112, rack 3 114, rack 4 116, rack 5 118, rack 6 120, rack 7 122, and rack 8 124. Racks 1-8 are coupled to input/output (I/O) ports of serial port aggregator 130, racks 1-4 are coupled to I/O ports of cluster switch A 140, and racks 5-8 are coupled to I/O ports of cluster switch B 145. A configuration tool 150 is coupled to a serial port aggregator 130, a cluster switch A 140, and a cluster switch B 145. Although not illustrated in the same detail as row B, row A 100 also comprises eight racks, which may also be coupled to a serial port aggregator and additional cluster switches. The racks 110-124 are coupled by corresponding top of rack (TOR) switches (illustrated in FIG. 2) to serial port aggregator 130 and cluster switches 140 and 145 via communicative cables. Though not illustrated in the embodiment of FIG. 1, the functionality of the serial port aggregator 130 may be implemented with a console server.

The data center suite of FIG. 1 may comprise additional rows (not shown), and each row may comprise fewer or additional racks. As illustrated, two ports of cluster switch A 140 are coupled via two cables to each of racks 1-4 and two ports of cluster switch B 145 are coupled via two cables to each of racks 5-8. In additional embodiments, cluster switch A 140 and cluster switch B 145 may be coupled via fewer or more cables to each rack. In one embodiment, each rack is connected to two different cluster switches for the purposes of redundancy. Likewise, although only two cluster switches are shown, fewer or additional cluster switches may be used for each row or cluster, and fewer or more racks may be coupled to each cluster switch. Finally, additional serial port aggregators may be used for each data center row, or one serial port aggregator may be used for multiple data center rows.

Configuration tool 150 may comprise any type of computing device capable of interfacing or communicating with serial port aggregator 130 and cluster switch A 140 and B 145, such as a desktop, laptop, mainframe computer, terminal computer, mobile computer. In addition, a user of configuration tool 150, such as a data center operator, may interact with serial port aggregator 130 and cluster switch A 140 and B 145 through the user of an application running on configuration tool 150. In one embodiment, the application comprises a web browser or a dedicated data center suite interface application. Configuration tool 150 may be located remotely from the data center suite of FIG. 1. For example, configuration tool 150 may comprise a computer in a different building or even in a different city or state from the data center suite of FIG. 1. In such instances, configuration tool 150 may be coupled to serial port aggregator 130 and cluster switch A 140 and B 145 through the internet. Configuration tool 150 additionally comprises memory capable of storing network information, such as rack identities, rack physical locations and rack virtual locations.

Figures 2, 3:
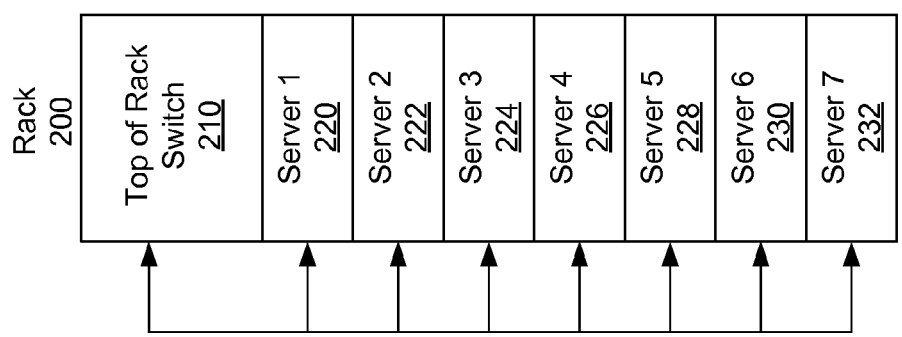
FIG. 2 is a high level block diagram illustrating a rack according to one embodiment.
FIG. 3 is an exemplary data table containing server identification information according to one embodiment.

FIG. 2 is a high level block diagram illustrating a rack according to one embodiment. FIG. 2 illustrates rack 200 comprising server 1 220, server 2 222, server 2 224, server 3 226, server 4 226, server 5 228, server 6 230, and server 7 232. Servers 1-7 are coupled via communicative cable to TOR switch 210. Rack 200 may contain additional or fewer servers coupled to TOR switch 210. TOR switch 210 may comprise a network switch which connects network segments, and may route data at the data link layer or the network layer of open systems interconnection model. Servers 1-7 may be web servers, files servers, database servers, communications servers, application servers, or any other type of computing asset that connects to and communicates with another computer and/or provides a service to another computer.

Racks are often received from vendors pre-built with servers pre-wired to a TOR switch. The racks may then be organized into rows in the data center as illustrated in FIG. 1. The physical location of a server in a data center may be represented by the data word:

[data center ID]/[suite ID]/[row ID]/[rack ID]/[server position]

For example, the physical location of the top server in rack 5 118 might be:

DC_1/Suite_1/Row B/Rack 5/Server 0001

Further, the physical location of a rack in a data center may be represented by a subset of this location information, such as [row ID]/[rack ID].

After organizing racks into rows, the racks may be organized into VLANs by being coupled to cluster switches. A cluster switch may be any type of network switch configured to couple network components within one or more VLANs. When coupling racks to cluster switches, a physical/virtual mapping may be obtained between the physical location of the rack and the virtual location of the rack (such as the cluster switch identity, VLAN or cluster switch port identity). For example, when installing rack 1 110 in FIG. 1, rack 1 110 may be coupled to cluster switch A ports 1 and 2, and may be a node within VLAN A 1. In one embodiment, each cluster switch port is associated with one VLAN, and vice versa. A data center operator may thus associate the physical location "Row B/Rack 1 " with cluster switch A 140, with VLAN A 1, or with cluster switch A ports 1 and 2 in a physical/virtual mapping. The physical/virtual mapping may be imported or transmitted to and stored in configuration tool 150 for subsequent retrieval.

In conjunction with pre-built racks, vendors typically also provide server and rack identification information in spreadsheet form. FIG. 3 is an exemplary data table containing server identification information according to one embodiment. In the embodiment of FIG. 3, the spreadsheet provided by a vendor identifies network components (the "type" column), the serial number of the network components (the "serial" column), the MAC address of the network components (the "MAC" column), the identity/serial number of the rack which the network components belong to (the "Rack Serial" column), and the physical location of the network components (the "Position" column"). Fewer or additional server identification information may be provided by vendors, and the information may be provided in different formats. In addition, certain server identification information may be filled in by parties other than the vendors, such as data center operators or third-parties. For example, in the spreadsheet of FIG. 3, the "Position" column may be empty when received from a vendor. Some or all server identification information received from a vendor may be imported into and stored in configuration tool 150. It should be noted that reference to a rack serial number may refer to the serial number of a TOR switch.

Serial port aggregator 130 allows a remote data center operator the ability to scan the racks coupled to serial port aggregator 130, such as the racks of Row B 105 in the embodiment of FIG. 1. In one embodiment, a data center operator uses configuration tool 150 to scan racks with serial port aggregator 130. In scanning a rack, serial port aggregator 130 may determine if the rack is configured or unconfigured. Configured, as used herein, may describe any state of rack operation set by a serial port aggregator, a data center operator, or any other entity. For example, a rack may be determined to be configured if the rack's physical location is associated with the rack's serial number within configuration tool 150. Alternatively, a rack may be determined to be configured if the rack has previously been configured by configuration tool 150. In addition, a configured rack may or may not require additional configuration in order to be fully operational.

In one embodiment, serial port aggregator 130 scans a rack by transmitting a message to a rack's TOR switch and determining that the rack is configured or unconfigured based on the response received from the TOR switch. For instance, the TOR switch may respond with a message in a particular format which indicates that the rack is configured or unconfigured. Alternatively, the TOR switch may fail to respond, which may indicate that the rack is unconfigured. In one embodiment, serial port aggregator 130 scans all racks coupled to serial port aggregator 130 by transmitting a message on each input/output port of serial port aggregator 130, or by transmitting a message to each individual rack's TOR switch.

The serial port aggregator 130 may request the identities of any racks determined to be unconfigured. Requesting the identity of an unconfigured rack may comprise transmitting a request for a rack serial number to the TOR switch of an unconfigured rack, or may comprise transmitting a request for a TOR switch serial number to a rack's TOR switch. Alternatively, when serial port aggregator 130 scans for unconfigured racks, the identity of any unconfigured racks may be requested or may be automatically transmitted from the unconfigured rack or the unconfigured rack's TOR switch to serial port aggregator 130 when an unconfigured rack or the unconfigured rack's TOR switch is scanned. For example, if serial port aggregator 130 scans rack 7 122, and if rack 7 122 is unconfigured, the TOR switch of rack 7 122 may automatically transmit the serial number of rack 7 122 to serial port aggregator 130, or serial port aggregator 130 may request the serial number of rack 7 122 during scanning The retrieved identities for unconfigured racks may be transmitted to configuration tool 150 for storage. Once the identities of unconfigured racks are retrieved, a data center operator may query the rack identification information provided by rack vendors stored in configuration tool 150 to verify that the racks associated with the retrieved rack identities are present in the data center.

Serial port aggregator 130 may request the virtual location of any racks determined to be unconfigured. In one embodiment, a data center operator uses configuration tool 150 to request rack virtual locations with serial port aggregator 130. In one embodiment, requesting the virtual location of an unconfigured rack comprises transmitting a message to the unconfigured rack. In such an embodiment, the unconfigured rack may use a link layer protocol, such as the link layer discovery protocol (LLDP) or the Cisco discovery protocol (CDP), to determine the virtual location of the configured rack and to transmit the determined virtual location to serial port aggregator 130. For example, serial port aggregator 130 may request the virtual location of rack 2 112 in response to determining that rack 2 112 is unconfigured. Rack 2 112 may use LLDP to determine that it is coupled to ports 3 and 4 of cluster switch A 140, or that it is coupled to VLAN A2. In the event that only one of a cluster switch port or a VLAN are determined, the configuration tool 150 may consult a mapping to determine that the determined cluster switch port corresponds to a particular VLAN, and vice versa. Rack 2 112 may then transmit this virtual location to serial port aggregator 130. Retrieved virtual locations for unconfigured racks may be stored in the configuration tool 150.

The configuration tool 150 may associate retrieved virtual locations and rack identities with physical rack locations using the stored physical/virtual mapping. For example, the virtual location of a rack with the rack serial number "5678" may be stored as ports 3 and 4 of cluster switch B 145. Further, the physical/virtual mapping may associate the physical location "rack 6/row B" with ports 3 and 4 of cluster switch B 145. The configuration tool 150 may thus associate and store rack serial number "5678" with the physical location "rack 6/row B." In this way, the configuration tool 150 may automatically associate rack identities with physical locations, thus precluding the need for manually scanning racks.

The configuration tool 150 may store the physical location of identified racks in the data imported from a vendor spreadsheet. For example, the configuration tool 150 may store server and rack identification information provided by a vendor in the format of FIG. 3. In this example, when the configuration tool 150 associates a physical location with a rack identity (such as a rack serial number), the configuration tool 150 may store the physical location of each server or rack in the "Position" column. In one embodiment, when a physical location is associated with a rack serial number, the configuration tool 150 may query the imported server and rack identification information and individually associate each data center component associated with the rack serial number with the physical location. For example, in the embodiment of FIG. 3, if the rack serial number "1234" is determined to be associated with a rack at the location "row X/rack Y," then the configuration tool 150 may query all rack components associated with the rack serial number "1234" and may associate all queried components with the physical location "row X/rack Y."

The configuration tool 150 may store the virtual location of identified racks in the data imported from a vendor spreadsheet. In one embodiment, the virtual location of identified racks is used to query the physical/virtual mapping stored by configuration tool 150 to determine the physical location of identified racks. In the embodiment of FIG. 3, the virtual location of identified racks may be stored in an additional column (not shown). For instance, if the rack associated with rack serial number "1234" is determined to be coupled to virtual location "VLAN A5," then all servers associated with rack serial number "1234" may in turn be associated with virtual location "VLAN A5."

Unconfigured servers or racks may be configured by the configuration tool 150 using the information obtained in the process described above. In one embodiment, once the physical location and virtual location of one or more racks and their components are known, the configuration tool 150 may configure unconfigured racks and servers. The configuration tool 150 may configure unconfigured racks using stored rack identities and virtual locations. In the embodiment of FIG. 2, the configuration tool 150 may determine the virtual location of the servers in rack 200 and may configure the TOR switches of servers 1-7 to operate as network segments within the virtual location. For example, configuration tool 150 may determine that servers 1-7 are coupled to "VLAN A5," and may configure servers 1-7 to operate as segments within VLAN A5. In addition, the configuration tool 150 may query the information stored in the configuration tool 150 to identify the computing assets in a particular rack, and may associate the known physical location of the rack with each asset in the rack.

The configuration tool 150 may also detect virtual location configuration errors in the data center using the stored rack identification and virtual location information. For example, when the configuration tool 150 queries rack identification information to obtain its virtual location, the configuration tool 150 may receive in response to its query more than one virtual location, such as more than one VLAN. If a rack is determined to be associated with more than one virtual location, this may be caused by multiple ports wired to the same rack. Accordingly, the configuration tool 150 may report this error by indicating that the rack is improperly configured and flagging the improperly configured rack for later maintenance by a data center operator.

Figure 4:
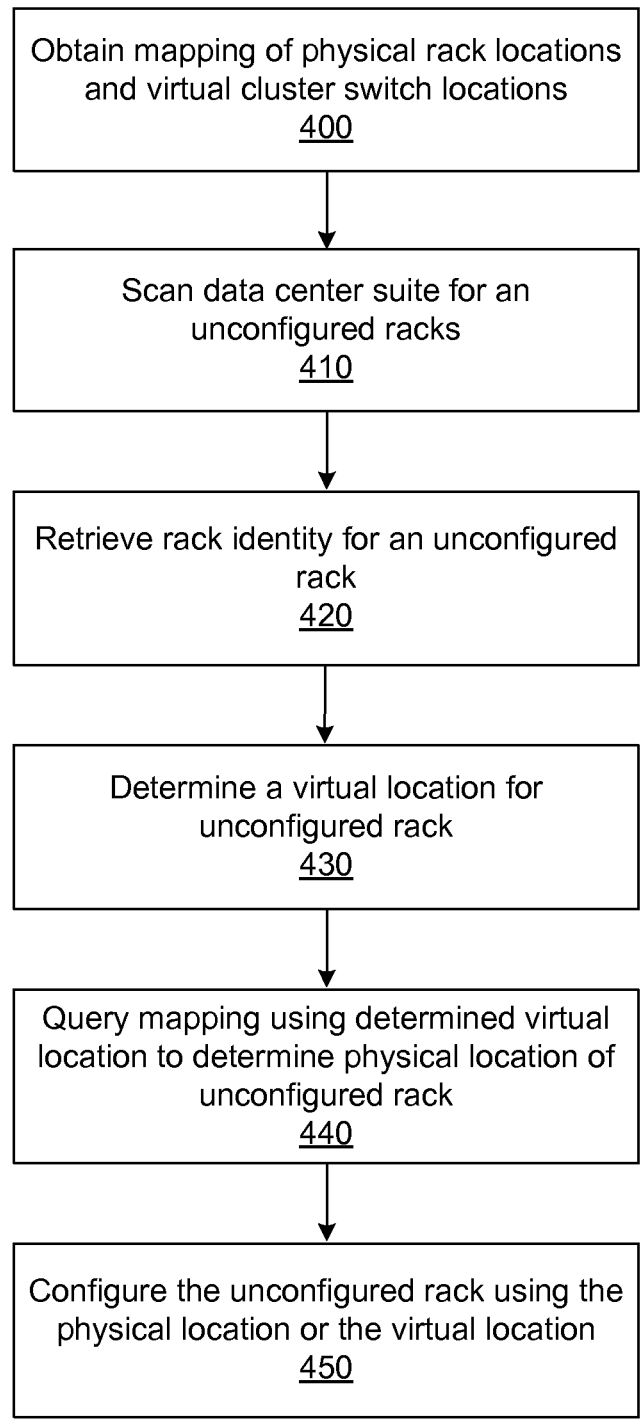
FIG. 4 is a flow chart illustrating a process for determining the physical location of racks within a data center, according to one embodiment.

FIG. 4 is a flow chart illustrating a process for determining the physical and virtual locations of one or more unconfigured racks within a data center, according to one embodiment. A physical-to-virtual mapping between physical rack locations and virtual cluster switch locations is obtained 400. The mapping may associate particular cluster switch ports with physical locations within a data center suite. The data center suite is scanned 410 to identify unconfigured racks. Scanning may comprise transmitting a status request message to each rack in the data center suite, and identifying which racks require configuration. A rack identity is retrieved 420 for an unconfigured rack. The rack identity may be a rack serial number or a TOR switch serial number. A virtual location is determined 430 for the unconfigured rack. The virtual location may be a VLAN, a cluster switch port, or any other suitable virtual location. The physical/virtual mapping is queried 440 using the determined virtual location of the unconfigured rack to determine the physical location of the unconfigured rack. For example, if the unconfigured rack is coupled to a particular VLAN, the physical/virtual mapping may be queried using the particular VLAN, and an associated physical location may be determined. Finally, the unconfigured rack is configured 450 using one of the determined virtual location or the determined physical location.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    scanning each server rack within a data center to request virtual locations associated with the server rack from the server rack, the scanning comprising:
        sending a message to each of a plurality of racks in the data center;
        receiving a set of responses to the messages, each response indicative of a virtual location of a corresponding rack;
    identifying a physical server rack associated with a physical location and with a plurality of virtual locations based on the scanning; and
    responsive to identifying the server rack:
        determining the physical location of the identified server rack based on a virtual location associated with the identified server rack; and
        reporting an error condition indicating that the identified server rack is associated with a plurality of virtual locations.

2. The method of claim 1, wherein identifying the server rack comprises accessing a serial number for a top of rack (TOR) switch located in the server rack.

3. The method of claim 1, wherein identifying the server rack comprises identifying a port of a cluster switch to which the server rack is coupled.

4. The method of claim 1, wherein the physical location of the identified server rack is determined using a mapping between a plurality of physical server rack locations and a plurality of virtual server rack locations in the data center.

5. The method of claim 4, wherein the mapping corresponds to a set of communication lines that each couple a port of a cluster switch to a physical location in the data center.

6. The method of claim 1, wherein the scanning is performed by a serial port aggregator coupled to each server rack in the data center.

7. A data center comprising:
    a plurality of server racks;
    a serial port aggregator configured to scan each server rack to request virtual locations associated with the server rack from the server rack, the scan operating to:
        send a message to each of a plurality of racks in the data center; and
        receive a set of responses to the messages, each response indicative of a virtual location of a corresponding rack; and
    an error detection module configured to:
        identify a physical server rack associated with a physical location and with a plurality of virtual locations based on the scanning; and
        responsive to identifying the server rack:
            determine the physical location of the identified server rack based on a virtual location associated with the identified server rack; and
            report an error condition indicating that the identified server rack is associated with a plurality of virtual locations.

8. The system of claim 7, wherein identifying the server rack comprises accessing a serial number for a top of rack (TOR) switch located in the server rack.

9. The system of claim 7, wherein identifying the server rack comprises identifying a port of a cluster switch to which the server rack is coupled.

10. The system of claim 7, wherein the physical location of the identified server rack is determined using a mapping between a plurality of physical server rack locations and a plurality of virtual server rack locations in the data center.

11. The system of claim 10, wherein the mapping corresponds to a set of communication lines that each couple a port of a cluster switch to a physical location in the data center.

12. The system of claim 7, wherein the serial port aggregator is coupled to each server rack in the data center.

13. A method comprising:
- a step for scanning each server rack within a data center for requesting virtual locations associated with each server rack in a data center, comprising:
  - a step for sending a message to each of a plurality of racks in the data center; and
  - a step for receiving a set of responses to the messages, each response indicative of a virtual location of a corresponding rack;
- a step for identifying a physical server rack associated with a physical location and with a plurality of virtual locations; and
- responsive to identifying the server rack:
  - a step for determining the physical location of the identified server rack; and
  - reporting an error condition indicating that the identified server rack is associated with a plurality of virtual locations.

* * * * *